(12) United States Patent
El Harti (10) Patent No.: US 7,361,907 B2
(45) Date of Patent: Apr. 22, 2008

(54) METHOD FOR DIRECT DOSIMETRY OF RADIOACTIVE NUCLEI IN DIFFERENT TYPES OF SAMPLES USING SOLID-STATE DETECTORS OF NUCLEAR TRACES

(75) Inventor: Abdeslam El Harti, Lot Gay Victor N° 4 Rue Akrache, Souisi, Rabat (MA)

(73) Assignees: Abdeslam El Harti, Rabat (MA); Khalid Maaouni, Rabat (MA); ASD (Advanced Scientific Developments), Casablanca (MA)

( * ) Notice: Subject to any disclaimer, the term of this patent is extended or adjusted under 35 U.S.C. 154(b) by 306 days.

(21) Appl. No.: 10/546,936

(22) PCT Filed: Feb. 12, 2004

(86) PCT No.: PCT/MA2004/000001

§ 371 (c)(1),
(2), (4) Date: Aug. 26, 2005

(87) PCT Pub. No.: WO2004/077095

PCT Pub. Date: Sep. 10, 2004

(65) Prior Publication Data

US 2006/0192138 A1 Aug. 31, 2006

(30) Foreign Application Priority Data

Feb. 26, 2003 (MA) .................................. 27055

(51) Int. Cl.
*G01T 1/04* (2006.01)

(52) U.S. Cl. .................................................. 250/472.1

(58) Field of Classification Search ............. 250/472.1
See application file for complete search history.

(56) References Cited

U.S. PATENT DOCUMENTS 3,418,472 A * 12/1968 Evans .................... 250/473.1
5,117,120 A * 5/1992 Margaliot et al. ...... 250/559.39

OTHER PUBLICATIONS

El-Hawary, M.M.; Mansy, M.; Hussein, A.; Ammar, A.A.; and El-Sercy, A.R. "Alpha Particle Absorption and Inclined Incidence Track Parameter Evaluation in Plastic Detectors" In Radiation Physics and Chemistry 54 (1999), pp. 547-550.

* cited by examiner

*Primary Examiner*—David Porta
*Assistant Examiner*—Mindy Vu
(74) *Attorney, Agent, or Firm*—Egbert Law Offices (57) ABSTRACT

The invention concerns a novel method adapted to experimental conditions, for determining the function defining the actual detecting sensitivity of a solid-state detector of nuclear traces and which represents the detecting performances for each type of nucleus emitting energy alpha particles Ei, located in each position inside a sample to be analyzed, and hence precision dosimetry of the radioactive nuclei in a sample using nuclear trace solid-state detectors. The method provides an improvement of the quality of sample analyses, a significant reduction of analysis costs and an important widening of the scope of application of this type of detectors. Thus, the method will bring about the development of a new generation of detectors having a better price-quality ratio which can be found in the field of radioactive nuclei analyses in different types of samples.

3 Claims, 4 Drawing Sheets

METHOD FOR DIRECT DOSIMETRY OF RADIOACTIVE NUCLEI IN DIFFERENT TYPES OF SAMPLES USING SOLID-STATE DETECTORS OF NUCLEAR TRACES

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a method for direct dosimetry of radioactive nuclei in different types of samples using solid-state detectors of nuclear traces.

BACKGROUND OF THE INVENTION

The history of solid state nuclear track detectors began in 1958 after initial observations by D. A. Young of fission fragment tracks of lithium fluoride (LiF) irradiated by thermal neutrons. In 1959, Silk and Barnes made these same observations on mica using an electron microscope. Numerous observations have been made since then on a large number of materials. The detectors have the ability to record the passage of particles such as alpha particles, protons, and fission fragments.

In the years that have passed, work by the international scientific community on solid state nuclear track detectors made it possible to develop several dosimetry methods for radioactive nuclei with the use of these detectors. Though these methods use basic knowledge of calculation of the probability that an alpha particle emitted from a radioactive nucleus of a sample can reach and be recorded on a solid state nuclear track detector, they are based on estimation of the global critical angle depending on the sample, the characteristics of the particles to be detected, and the detector. The estimation thus induces an error in the calculation and makes the solid state nuclear track detectors (SSNTDs) imprecise.

Other methods of detection that do not use solid state nuclear track detectors already exist. They involve, for example, geochemical analyses and instrumental techniques such as analysis by neutron activation, analysis by mass spectometry or analysis by gamma spectrometry and liquid scintillation analysis. All of these techniques, often destructive to the samples analyzed, use equipment that is heavy, sophisticated, and especially costly.

BRIEF SUMMARY OF THE INVENTION

In order to correct these disadvantages, a new method has been developed. It is based on the implementation of a new technique specified for calculating the sensitivity of a solid state nuclear track detector for each type of nucleus emitting alpha particles having energy $E_1$ located in each position in the sample to be analyzed. This method does not allow the estimation but instead the calculation without errors of the critical angle of incidence depending on the sample, the characteristics of the alpha particles to be detected, and the detector. Thus, this method is based on the actual function of the critical angle of incidence which makes it possible to solve the problem of the sample-detector geometry, and as a result, determination of the function that defines the real sensitivity of detection of a solid state nuclear track detector (SSTND) and which represents the efficiency of detection for each type of nucleus emitting alpha particles having energy $E_1$ located in each postion in the middle of the sample to be analyzed.

Applications of this method allow an improvement in the quality of sample analyses, a considerable reduction of costs for analysis and a great enlargement in the field of application for this type of detector. Thus, a new generation of detectors will be born having a better price-to-quality ratio than has existed until now in the domain of analyses of radioactive nuclei in different types of samples.

DETAILED DESCRIPTION OF THE INVENTION

II. Methodology and Procedures for Evaluation of Different Parameters

Figure 1:
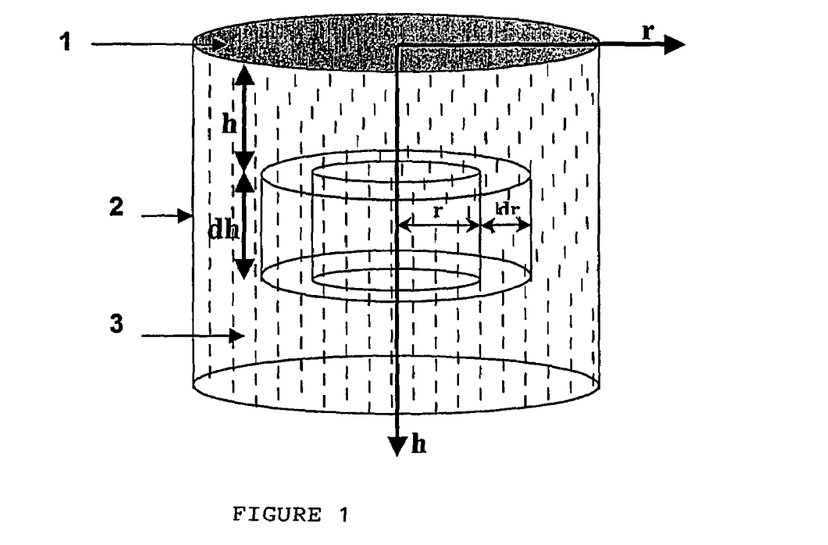
FIG. 1 shows a schematic view of the cell of radiation which is represented by the elementary volume element and considered as the sample and analyzed.

Let (dv) be the volume element of a cylinder having a radius between r and r+dr and a height between h and h+dh inside the sample analyzed, see FIG. II-1 in the drawings section where: (1: SSNTD, 2: plastic capsule, 3: sample analyzed).

$$dv = 2\pi r dr dh$$

Let $dN_i$ be the number of the alpha particle having energy $E_i$ emitted by the radioactive element having index i contained in the volume dv and for the exposure time te:

$$dN_i = A_{ci}^{te} \cdot dv$$

Where $A_{ci}^{te}$ is the alpha activity of the radioactive nuclei of the emitter element i of the alpha particle having energy $E_i$ per unit volume and for the exposure time te.

It is thus necessary to multiply the number $dN_i$ of alpha particles emitted in the volume dv by a probability of detection $P_i(r,h)$, [$P_i(r,h)$ is the probability that an alpha particle of energy $E_i$ emitted by the nucleus of index i contained in the volume dv can be detected by the solid state nuclear track detector] and which also represents the efficiency of detection of alpha particles of energy $E_i$ emitted by the nucleus of index i contained in the volume dv.

As a result, for radioactive nuclei of element i contained in the volume dv, the number of tracks developed will be:

$$dn_i = A_{ci}^{te} \cdot P_i(r,h) \cdot dv$$

Where: $dn_i$ is the number of alpha particles having energy $E_i$ emitted by the nuclei of index i contained in the volume dv, for the time of exposure (te) and which are detected in our solid state nuclear track detector.

Actually, the total number of tracks observed due to the radioactive nuclei of index i contained in the total volume is:

$$n_{it} = 2\pi \cdot A_{ci}^{te} \cdot \iint P_i(r,h) \cdot rdrdh$$

II-1 Method for Calculating the Probability $P_i(r,h)$.

Figure 5:
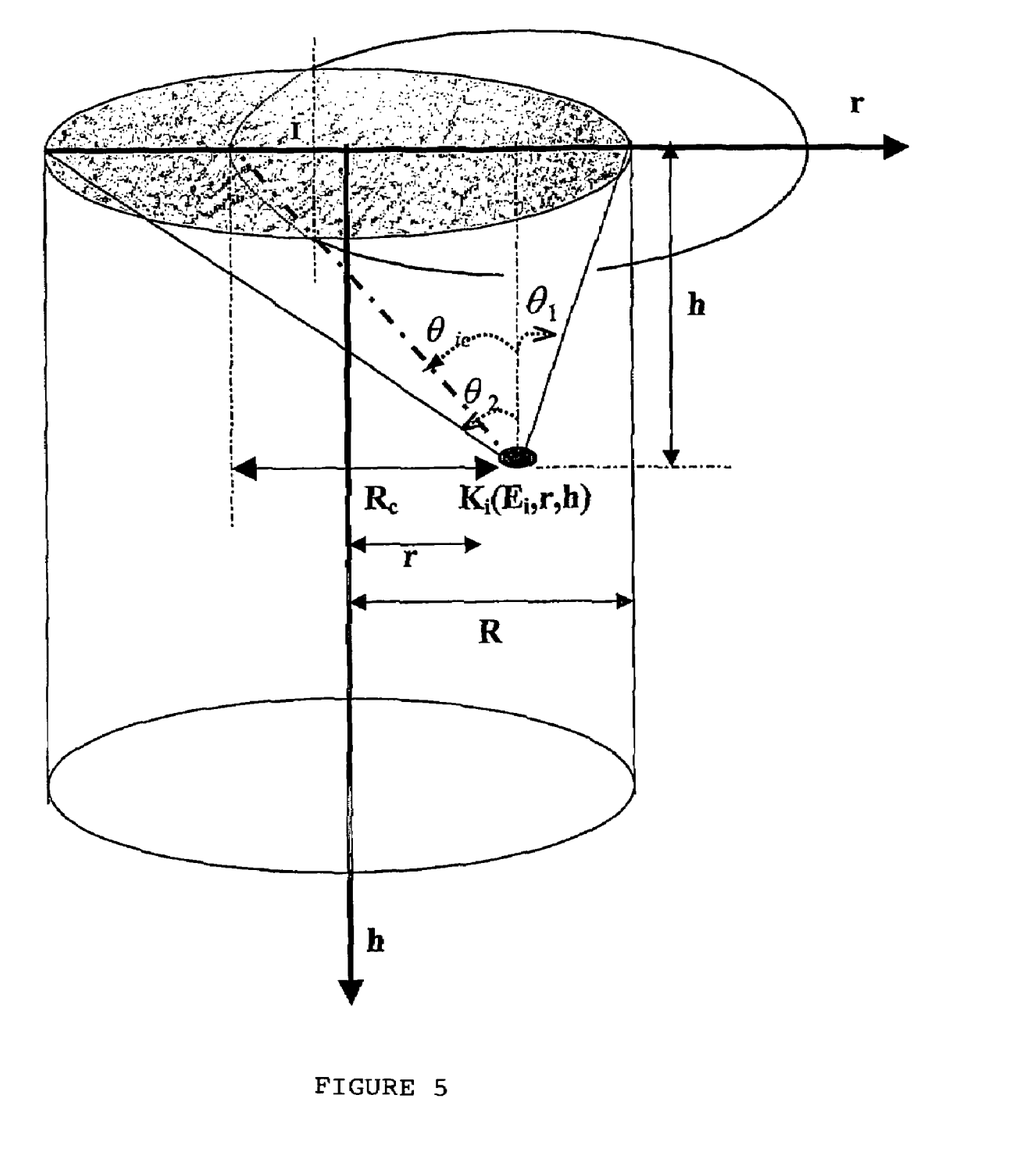
FIG. 5 shows a schematic view of $S(\theta_{ic}) \cap S(R)$ and $S(\theta_{ic})$ in the case of $(\theta_{ic}) \geq (\theta_1)$ and $(\theta_{ic}) \leq (\theta_1)$.

Let a nucleus of index i denoted $K_i$, an emitter of alpha particles of energy $E_i$, be located in a position of coordinates (r,h) (see FIG. II-5 in the drawings section) such that these emitted particles give rise to observable tracks on the solid state nuclear track detector. The particles must satisfy two conditions:

1—they are emitted at a well-defined angle of incidence by means of the function of the critical angle of incidence ($\theta_{ic}$).
2—they reach the detector.

II-1-1 Identification and Evaluation of the Function ($\theta_{ic}$).

A) Identification of the Function ($\theta_{ic}$).

Figure 2:
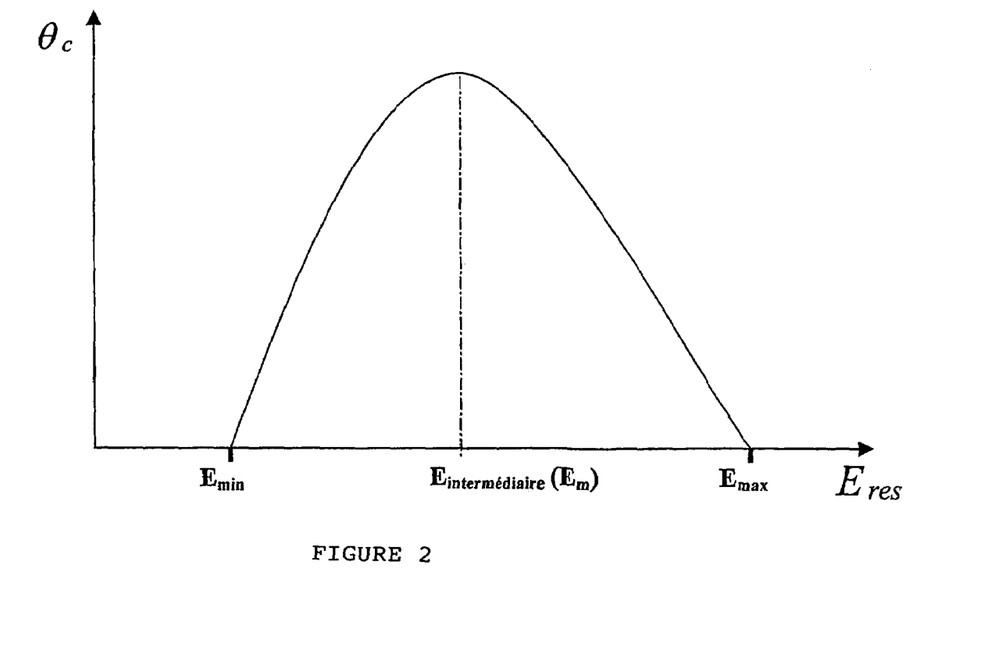
FIG. 2 shows a graph illustration of the experimental and intrinsic function of a SSNTD describing the variation of the critical angle ($\theta_c$) resolving the tracks as a function of the residual energy for conditions enabling chemical resolution and reading of well-defined tracks. This function is from a solid state nuclear track detector that is currently the most used (CR-39: LR-115).

FIG. II-2 in the drawings section shows the experimental and intrinsic function of a SSNTD describing the variation of the critical angle ($\theta_c$) resolving the tracks as a function of the residual energy for conditions enabling chemical resolution and reading of well-defined tracks. This function is from a solid state nuclear track detector that is currently the most used (CR-39; LR-115). Three possible cases can be distinguished:

$$*E_{ind} < E_{min},\ *E_{ind} \leq E_{min} \leq E_{min},\ *E_{ind} > E_{max}$$

where:

$E_{ind}$ is the residual energy at normal incidence on the detector of the alpha particle having energy $E_i$ emitted from a nucleus located at a height h from the plane of the detector.

$E_{min}$ is the minimum energy detectable at normal incidence.

$E_{max}$ is the maximum energy detectable at normal incidence.

Comment: The identification of $(\theta_{ic})=f(h)$, $(\theta_{ic1})=f_a(h)$, and $(\theta_{ic2})=f_b(h)$ can also be means of the inverse function of the function $(\theta_c)=f(E_{res}):E_{res}=f(\theta_c)$ which shows the minimum and maximum detectable for each incidence ($\theta_i$).

A-1—Case of Nuclei Emitters of Alpha Particles Having Energy $E_i$ and with $E_{ind} < E_{min}$.

These are nuclei located in the volume for contribution to the tracks defined by $h\epsilon[R_i-R_{min},R_i]$ for the case without an absorbent medium, given $R_i$ and the total trajectory in the sample of the alpha particle having energy $E_i$ in the sample, and given $R_{min}$ and the total trajectory in the sample of an alpha particle having energy $E=E_{min}$. All alpha particles having energy $E_i$ emitted from these nuclei will reach the detector with an energy lower than $E_{min}$ and as a result will not be detected.

A-2—Case of Nuclei Emitters of Alpha Particles Having Energy $E_i$ and $E_{min} \leq E_{ind} \leq E_{max}$.

These are nuclei located in the volume for contribution to the tracks defined by $h\epsilon[R_i-R_{max}, R_i-R_{min}]$ for the case without an absorbent medium, given $R_{max}$ and the total trajectory in the sample of an alpha particle having energy $E=E_{max}$.

For a better explanation, according to FIG. II.2, there are two cases: $E_{ind}$ less than the intermediate energy denoted ($E_m$) and $E_{ind}$ greater than the intermediate energy $E_m$.

Figure 3:
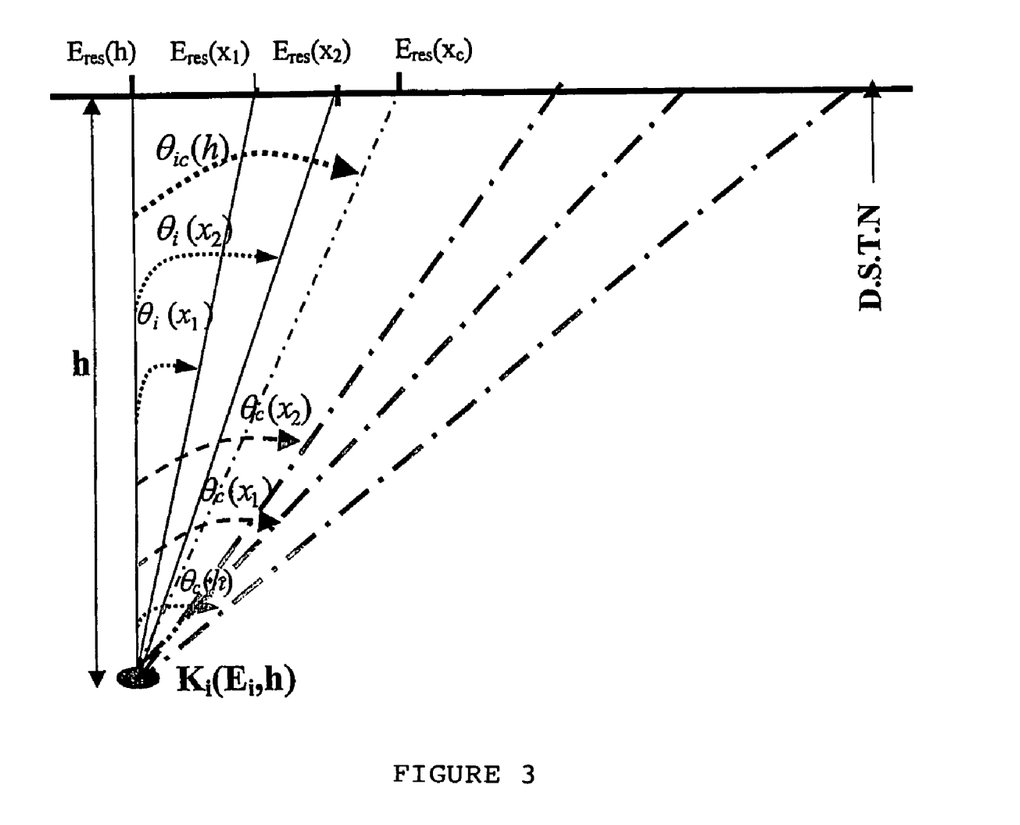
FIG. 3 shows a graph illustration of the variation in the sample space, from ($\theta_i$) and ($\theta_c$) as a function of the residual energy and trajectory (X), of an alpha particle of energy $E_i$ and $E_{ind} \epsilon [E_{min}, E_m]$ emitted of a radioactive core located at the height h from the surface of the detector.

1—Case where $E_{ind}$ is Less than $E_m$:

FIG. II-3 in the drawings section shows the variation in the sample space, from ($\theta_i$) and ($\theta_c$) as a function of the residual energy and trajectory (X), of an alpha particle of energy $E_i$ and $E_{ind}\epsilon[E_{min}, E_m]$ emitted of a radioactive core located at the height h from the surface of the detector. It is observed that:

when the residual energy decreases, ($\theta_c$) decreases and ($\theta_i$) increases.

for ($\theta_i$)=0 (normal incidence for each position h), the corresponding ($\theta_c$) has the larger value for each position h, and when ($\theta_i$) increases, ($\theta_c$) decreases. Thus, ($\theta_{ic}$) for each position h is none other than the intersection between the angle of incidence of the particle to be detected ($\theta_i$) and the resolution angle of the detector ($\theta_c$), because from this value, ($\theta_i$) is greater than ($\theta_c$).

2—Case where $E_{ind}$ is Greater than $E_m$;

At first, in the interval of residual energy $[E_m, E_{ind}]$, it is observed that when the residual energy decreases, ($\theta_i$) increases and ($\theta_c$) increases.

Secondly, in the interval of residual energy $[0, E_m]$, it is observed that when the residual energy decreases, ($\theta_i$) increases and ($\theta_c$) decreases.

For ($\theta_i$)=0 (normal incidence for each position h), the corresponding angle ($\theta c$) is also greater than zero for each position h and when ($\theta_i$) increases, ($\theta_c$) increases and then decreases, thus when the function appears as $(\theta_c)=F(E_{res})$ {strong phase of decrease of $(\theta_c)$ for $E_{res}\epsilon[E_m, E_i]$}, ($\theta_i$) will have one and only one intersection with ($\theta_c$) for each position h, i.e. in the first interval or in the second interval of energy, from this value of intersection, ($\theta_i$) is greater than ($\theta_c$).

Thus, in a general manner, when the function appears as $(\theta_c)=F(E_{res})$, for each position h where $E_{min} \leq E_{ind} \leq E_{max}$, ($\theta_{ic}$) is none other than the intersection between the angle of incidence of the particle to be detected ($\theta_i$) and the resolution angle of the detector ($\theta_c$).

A-3—Case of Nuclei Emitters of Alpha Particles Having Energy $E_i$ and for which $E_{ind} > E_{max}$.

These are nuclei located in the volume for contribution to the tracks defined by $h\epsilon[0, R_i-R_{max}]$, for the case without an absorbent medium, where $R_{max}$ and the total trajectory in the sample of an alpha particle having energy $E=E_{max}$.

In the same manner as above, when the function has the appearance $(\theta_c)=F(E_{res})$, there will be either zero intersections, or 2 intersections between ($\theta_i$) and ($\theta_c$) for each (h) which will be denoted ($\theta_{ic1}$) and ($\theta_{ic2}$) which correspond respectively to the maximum energy and to the one that is the minimum detectable at oblique incidence for each (h).

Thus, for $E_{ind} > E_{max}$, only the particles emitted at angles between ($\theta_{ic1}$) and ($\theta_{ic2}$) will be detected if they reach the detector.

B) Evaluation of the Function ($\theta_{ic}$).

In order to determine ($\theta_{ic}$), ($\theta_{ic1}$), and ($\theta_{ic2}$) as a function of h, for the case without an absorbent medium, proceed as follows:

($\theta_{ic}$)=$f_1(E_{res})$=$f_2(x)$, $E_{res} \in [0, E_i]$, $x \in [0, R_i]$ $R_i$ is the total trajectory of the particle of energy $E_i$ in the medium analyzed.

x: is the trajectory of the particle of energy $E_i$ in the medium analyzed, this particle reaches the detector with an energy $E_{res}$, x will be determined from the relation between energy and particle in the medium analyzed [2].

($\theta_i$)=arc cos(h/x)=$g_2(h,x)$=$g_1(h, E_{res})$, $x \in [h, R_i]$ h is the position of the radioactive nucleus emitter of the particle of energy $E_i$ relative to the surface of the detector.

x: is the trajectory of the particle of energy $E_i$ in the medium analyzed and varies from h to $R_i$ for each position h.

In fact, ($\theta_{ic}$) will be determined by solving the equation: $g_2(h,x)=f_2(x)$ for the heights $h_i$ where it is confirmed that $E_{min} \leq E_{ind} \leq E_{max}$, ($\theta_{ic1}$) and ($\theta_{ic2}$) will be determined by solving the equation: $g_2(h,x)=f_2(x)$ for the heights $h_i$ where it is confirmed that $E_{ind} > E_{max}$. Thus, a determination is done of ($\theta_{ic}$)=f(h) for the values of h for which $E_{min} \leq E_{ind} \leq E_{max}$, ($\theta_{ic1}$)=$f_a(h)$ and ($\theta_{ic2}$)=$f_n(h)$ for the values of h for which $E_{ind} > E_{max}$.

It is possible to convert from a function $f_1(E_{res})$ to its equivalent $f_2(x)$ for each type of alpha particle having energy ($E_i$) and total trajectory in the sample analyzed ($R_i$), emitted from a nucleus located in a position (h) within the sample to be analyzed, either by the slope of the function of Linear Energy Transfer (L.E.T.=dE/dx) of the alpha particles in a medium, or by the Energy-Trajectory relation [E=f(R)] of the alpha particles in a medium:

For the case without an absorbing medium:
Using the function of Linear Energy Transfer (dE/dx) in the medium to be analyzed:

$$E_{res} = \int_0^{R_i-x} \frac{dE}{dx} \cdot dx = E_i - \int_{R_i-x}^{R_i} \frac{dE}{dx} \cdot dx$$

thus an $E_{res}$ corresponds for each x and, as a result, the conversion of a function $f_1(E_{res})$ to its equivalent $f_2(x)$ and vice-versa.

Using the Energy-Trajectory relation, [E=f(R)] in the medium to be analyzed:

The function E=f(R) is used and the change in the variable (R) is made by ($R_i$-x), this function becomes: $E_{res}$=$31_i$-x), thus for each x, the corresponding $E_{res}$ will be determined and as a result, the conversion from one function $f_1(E_{res})$ to its equivalent $f_2(x)$ and vice-versa.

Figure 4:
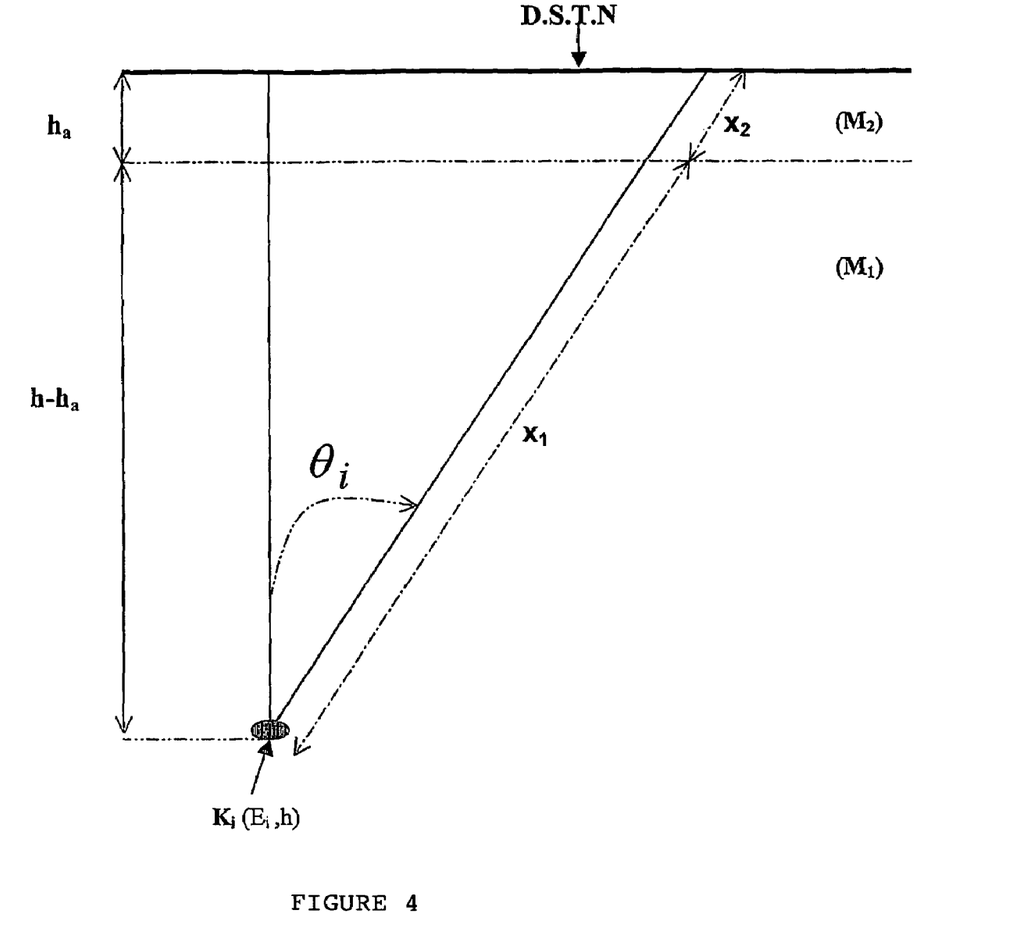
FIG. 4 show a graph illustration of the trajectory of the alpha particle of energy $E_i$ emitted of a core $K_i$ located at the height h, in the medium to be analyzed and the absorbent medium.

For the case with an absorbing medium:
Using the Energy-Trajectory relation [E=f(R)]:

According to FIG. II-4 shown in the drawings section, where [(M1): medium to be analyzed. (M2): absorbent medium. ($h_a$): thickness of the absorbent medium. $x_1$ and $x_2$ are, respectively, the trajectory of the alpha particle in the analyzed medium and the one in the absorbent medium.]:

Given:

$$\cos(\theta_i) = \frac{h - h_a}{x_1} = \frac{h_a}{x_2} = \frac{h}{x}, x = x_1 + x_2$$

i.e.:
E=f(R), the Energy-Trajectory function of alpha particles in the medium to be analyzed.
R=g(E), the Energy-Trajectory function of alpha particles in the absorbent medium.
$E_{res1}$ and $E_{res}$ are, respectively, the residual energy of the incident alpha particle at the input of the absorbant medium and that at the input of the SSNTD.

Given $E_{res1}$=$f(R_i-x_i)$, thus $R_{lab}$=$g(E_{res1})$=$g \circ f(R_i-x_1)$. Where $R_{lab}$ is the total trajectory of the alpha particle having energy $E_{res1}$ in the absorbent medium.

As a result, [$R_{lab}-x_2$]=[$g \circ f(R_i-x_1)-x_2$]=$g(E_{res})$, or $$x_2 = x_1 \cdot \frac{h_a}{h-h_a} = x \cdot \frac{h_a}{h},$$

In fact, $$g \cdot f\left(R_i - x \cdot \frac{h_a}{h-h_a}\right) - x \cdot \frac{h_a}{h} = g(E_{res})$$

As a result, for each (h), each x corresponds to a residual energy $E_{res}$ at the input of the SSNTD. Thus, for each position ($h_i$), the function $g_2(h_i,x)$ will be transformed into its equivalent function $g_1(h_i, E_{res})$ and vice-versa. As a result, the resolution for each ($h_i$) of the equation $g_1(h_i, E_{res})$=$f_1(E_{res})$ will make it possible to determine $\theta_{ic}(h_i)$ for each ($h_i$) $\in [h_a, R_i + h_a - f^{-1} \circ g^{-1}(h_a)]$.

Using the function for Linear Energy Transfer (dE/dx);
The calculation methodology is the same as the one using the Energy-Trajectory relation, only instead of the functions Energy-Trajectory and Trajectory-Energy in the analyzed medium and the absorbent medium, they are replaced with the concept of the integral of the function for Linear Energy Transfer as described in the case without absorbent medium.

II-1-2—Determination of the Probability $P_i(r, h)$.

II-1-2-a—Case of Nucleus Emitting Alpha Particles of Energy $E_i$ and for which $E_{min} \leq E_{ind} \leq E_{max}$.

According to FIG. (II-5) shown in the drawings section, the proportion of particles emitted from a nucleus located in a position of coordinates (r, h) and at angles of incidence less than the critical angle of incidence ($\theta_{ic}$) which reach the detector is the ratio of the surface of intersection {between the surface described by the angle ($\theta_{ic}$) on the plane of the detector denoted s($\theta_{ic}$) and that of the detector denoted S(R)} and the surface described by the angle ($\theta_{ic}$) on the plane of the detector denoted s($\theta_{ic}$). This proportion is described by the following equation:

$$\left\{\frac{S(\theta_{ic}) \cap S(R)}{S(\theta_{ic})}\right\}$$

Thus, the probability that a particle of energy $E_i$ emitted by the nucleus having index i contained in the volume dv and confirmed by $E_{min} \leq E_{ind} \leq E_{max}$ can be detected by the solid state nuclear track detector is:

$$Pi(r, h) = \left\{\frac{1 - \cos\theta_{ic}}{2}\right\}\left\{\frac{S(\theta_{ic}) \cap S(R)}{S(\theta_{ic})}\right\}$$

Evaluation of $$\left\{\frac{S(\theta_{ic}) \cap S(R)}{S(\theta_{ic})}\right\},$$

with $S(\theta_{ic}) = \pi R_c^2$, where $R_c = h \cdot tg(\theta_{ic})$. (See FIG. II-5)
a) for $(\theta_{ic}) \geq (\theta_2)$, $S(\theta_{ic}) \cap S(R) = \pi R^2$, where R: radius of SSNTD
b) for $(\theta_{ic}) \leq (\theta_2)$: 2 cases are present, $(\theta_{ic}) \geq (\theta_1)$ and $(\theta_{ic}) \leq (\theta_1)$:
   if $(\theta_{ic}) \geq (\theta_1)$ $$S(\theta_{ic}) \cap S(R) = 2\left[\int_{r-R_c}^{l} \sqrt{R_c^2 - (x-r)^2} \cdot dx + \int_{l}^{R} \sqrt{R^2 - x^2} \cdot dx\right]$$

where $$l = \frac{R^2 + r^2 - R_c^2}{2r}$$

if $(\theta_{ic}) \leq (\theta_1)$: $S(\theta_{ic}) \cap S(R) = S(\theta_{ic})$

II-1-2-b—Case of Nuclei Emitting Alpha Particles of Energy $E_i$ and for which $E_{ind} > E_{max}$ According to FIG. (II-5) shown in the drawings section, the proportion of particles emitted from a nucleus located in a position of coordinates (r, h) and at angles of incidence between $(\theta_{ic1})$ and $(\theta_{ic2})$ which reach the detector is the ratio of the surface of intersection {between the surface of the ring described by the angles $(\theta_{ic1})$ and $(\theta_{ic2})$ on the plane of the detector denoted $s(\theta_{ic1}, \theta_{ic2})$ and that of the detector denoted $S(R)$} and the surface of the ring described by the angles $(\theta_{ic1})$ and $(\theta_{ic2})$ on the plane of the detector denoted $s(\theta_{ic1}, \theta_{ic2})$. This proportion is described by the following equation:

$$\left\{\frac{S(\theta_{ic1}, \theta_{ic2}) \cap S(R)}{S(\theta_{ic1}, \theta_{ic2})}\right\}$$

Thus, the probability that a particle of energy $E_i$ emitted by the nucleus having index i contained in the volume dv and confirmed by $E_{ind} > E_{max}$ can be detected by the solid state nuclear track detector is:

$$Pi(r, h) = \left\{\frac{\cos\theta_{ic1} - \cos\theta_{ic2}}{2}\right\}\left\{\frac{S(\theta_{ic1}, \theta_{ic2}) \cap S(R)}{S(\theta_{ic1}, \theta_{ic2})}\right\}$$

◆ Evaluation of $\left\{\frac{S(\theta_{ic1}, \theta_{ic2}) \cap S(R)}{S(\theta_{ic1}, \theta_{ic2})}\right\}$ with: $-S(\theta_{ic1}, \theta_{ic2}) = \pi(R_{c2}^2 - R_{c2}^2 - R_{c1}^2)$ where $R_{c1} = h \cdot tg(\theta_{ic1})$, $R_{c2} = h \cdot tg(\theta_{ic2})$
$-S(\theta_{ic1}, \theta_{ic2}) \cap S(R) = S(\theta_{ic2}) \cap S(R) - S(\theta_{ic1}) \cap S(R)$
a) for $(\theta_{ic1}) \geq (\theta_2)$, $S(\theta_{ic1}, \theta_{ic2}) \cap S(R) = \pi R^2 - \pi R^2 = 0$
   where R: radius of the SSNTD b) for $(\theta_1) \leq (\theta_{ic1}) \leq (\theta_2)$: there are 2 cases, $(\theta_{ic2}) \geq (\theta_2)$ and $(\theta_{ic2}) \leq (\theta_2)$
   if $(\theta_{ic2}) \geq (\theta_2)$:

$$S(\theta_{ic1}, \theta_{ic2}) \cap S(R) = \pi R^2 - 2\left[\int_{r-R_{c1}}^{l} \sqrt{R_{c1}^2 - (x-r)^2} \cdot dx + \int_{l_1}^{R} \sqrt{R^2 - x^2} \cdot dx\right]$$

where $l_1 = \frac{R^2 + r^2 - R_{c1}^2}{2r}$

◆if $(\theta_{ic2}) \leq (\theta_2)$: $S(\theta_{ic1}, \theta_{ic2}) \cap S(R) = S(\theta_{ic2}) \cap S(R) - S(\theta_{ic1}) \cap S(R)$ where:

$$S(\theta_{ic2}) \cap S(R) = 2\left[\int_{r-R_{c2}}^{l_2} \sqrt{R_{c2}^2 - (x-r)^2} \cdot dx + \int_{l_2}^{R} \sqrt{R^2 - x^2} \cdot dx\right]$$

$$l_2 = R^2 + r^2 - R_{c2}^2 \quad [sic]$$

and $$S(\theta_{ic1}) \cap S(R) = 2\left[\int_{r-R_{c1}}^{l_1} \sqrt{R_{c1}^2 - (x-r)^2} \cdot dx + \int_{l_1}^{R} \sqrt{R^2 - x^2} \cdot dx\right]$$

$$l_1 = \frac{R^2 + r^2 - R_{c1}^2}{2r}$$

c) for $(\theta_{ic1}) \leq (\theta_1)$: there are 2 cases, $(\theta_{ic2}) \geq (\theta_1)$ and $(\theta_{ic2}) \leq (\theta_1)$:
1—for $(\theta_{ic2}) \geq (\theta_1)$: there are 2 cases, $(\theta_{ic2}) \geq (\theta_2)$ and $(\theta_{ic2}) \leq (\theta_2)$:
   if $(\theta_{ic2}) \geq (\theta_2)$: $S(\theta_{ic1}, \theta_{ic2}) \cap S(R) = \pi R^2 - \pi R_{c1}^2$ ◆if $(\theta_{ic2}) \leq (\theta_2)$: $S(\theta_{ic1}, \theta_{ic2}) \cap S(R) =$ $$2\left[\int_{r-R_{c2}}^{l_2} \sqrt{R_{c2}^2 - (x-r)^2} \cdot dx + \int_{l_2}^{R} \sqrt{R^2 - x^2} \cdot dx\right] - \pi R_{c1}^2$$

2- for $(\theta_{ic2}) \leq (\theta_1)$: $S(\theta_{ic1}, \theta_{ic2}) \cap S(R) = S(\theta_{ic1}, \theta_{ic2}) = \pi R_{c2}^2 - \pi R_{c1}^2$ II-2—Generalization for the Total Contribution Volume for Resolution of Tracks:

According to the above, the total number of tracks observed and which are due to the radioactive nuclei of index i contained in the total volume:

$$n_{it} = 2\pi \cdot A_{ci}^{te} \cdot \int\int P_i(r,h) \cdot r \, dr \, dh$$

For the case $E_{min} \leq E_{ind} \leq E_{max}$, a comparison of $(\theta_{ic})$ with $(\theta_1)$ and $(\theta_2)$ allows to determine respectively $r_1(h)$ and $r_2(h)$ where these latter are characteristics of respectively the radii defining the interval of the volume where $(\theta_{ic}) \leq (\theta_1)$ from the one where $(\theta_{ic}) \geq (\theta_1)$ and the ones defining the interval of the volume where $(\theta_{ic}) \leq (\theta_2)$ from the one where $(\theta_{ic}) \geq (\theta_2)$.

For the case $E_{ind} > E_{max}$, a comparison of $(\theta_{ic1})$ with $(\theta_1)$ and $(\theta_2)$ allows to determine respectively $r_{1,1}(h)$ and $r_{2,1}(h)$ where these latter are characteristics of respectively the radii defining the interval of the volume where $(\theta_{ic}) \leq (\theta_1)$ [illegible] $(\theta_{ic}) \geq (\theta_1)$ and the ones defining the interval of the volume where $(\theta_{ic1}) \leq (\theta_2)$ [illegible] $(\theta_{ic1}) \geq (\theta_2)$. And a comparison of $(\theta_{ic2})$ with $(\theta_1)$ and $(\theta_2)$ allows us to determine respectively $r_{1,2}(h)$ and $r_{2,2}(h)$ where these latter are characteristics of respectively the radii defining the interval of the volume where $(\theta_{ic2}) \leq (\theta_1)$ from the one where $(\theta_{ic2}) \geq (\theta_1)$ and the ones defining the interval of the volume where $(\theta_{ic2}) \leq (\theta_2)$ from the one where $(\theta_{ic2}) \geq (\theta_2)$.

The next part of the procedure is an integration by parts of the interval over r and h.

To determine $r_1(h)$, $r_2(h)$, $r_{1,1}(h)$, $r_{2,1}(h)$, $r_{1,2}(h)$, and $r_{2,2}(h)$, it is simply a matter of solving the following equations:

It has: $-(\theta_{ic})=f(h)$; $(\theta_{ic1})=f_a(h)$; $(\theta_{ic2})=f_b(h)$ $$-(\theta_1) = \arccos\left[\frac{h}{\sqrt{h^2+(R-r)^2}}\right]; (\theta_2) = \arccos\left[\frac{h}{\sqrt{h^2+(R+r)^2}}\right]$$

thus:

$*(\theta_{ic})=(\theta_1) \Rightarrow r_1(h)$; $*(\theta_{ic})=(\theta_2) \Rightarrow r_2(h)$ $*(\theta_{ic1})=(\theta_1) \Rightarrow r_{1,1}(h)$; $*(\theta_{ic1})=(\theta_2) \Rightarrow r_{2,1}(h)$ $*(\theta_{ic2})=(\theta_1) \Rightarrow r_{1,2}(h)$; $*(\theta_{ic2})=(\theta_2) \Rightarrow r_{2,2}(h)$ Actually, the total volume of the sample contributing to the tracks ($V_t$) will be the total of a series of the volume $V_j$ ($V_t = \Sigma V_j$), where each $V_j$ itself corresponds to a probability $P_{i,j}(r,h)$.

In conclusion and in a general manner, the total number of tracks observed and which are due to the radioactive nuclei of index i contained in the total volume:

$$n_{it} = A_{ci}^{te} \cdot \sum_j \iiint P_{ij}(r,h) \cdot dv_j$$

where: Pij(r,h) and vj will be defined as a function of $r_1(h)$, $r_2(h)$, $r_{1,1}(h)$, $r_{2,1}(h)$, $r_{1,2}(h)$, and $r_{2,2}(h)$
with:

$$Pi(r,h) = \left(\frac{1-\cos\theta_{ic}}{2}\right)\left\{\frac{S(\theta_{ic}) \cap S(R)}{S(\theta_{ic})}\right\}; \text{ for } Emin \le Eind \le Emax$$

$$Pi(r,h) = \left(\frac{\cos\theta_{ic1}-\cos\theta_{ic2}}{2}\right)\left\{\frac{S(\theta_{ic1},\theta_{ic2}) \cap S(R)}{S(\theta_{ic1},\theta_{ic2})}\right\}; \text{ for } Eind > Emax$$

where:

$$\left\{\frac{S(\theta_{ic}) \cap S(R)}{S(\theta_{ic})}\right\} \text{ and } \left\{\frac{S(\theta_{ic1},\theta_{ic2}) \cap S(R)}{S(\theta_{ic1},\theta_{ic2})}\right\}$$

are well defined for c [sic]

III—Application Example:

Taking the simplest case, involving the media where the total trajectory of the particle $\alpha_i$ of energy $E_i$ is much less than the radius of the detector ($R_i$<<R) {case most reported due to the fact that this condition is verifiable for alpha particles in almost all liquid and solid samples} and a detector having a response function for conditions of developing and reading the well-defined tracks such as $E_{min}=0$ and $E_{max} > E_j$.

Following the above gives:

$$\cos(\theta_2) = \frac{h}{\sqrt{h^2+(R+r)^2}}$$

Thus, ($\theta_{2min}$) for (Ri<<R) approaches $$\frac{\pi}{2},$$

and as a result, ($\theta_{ic}$) is always less than ($\theta_2$)

Actually, a comparison of ($\theta_{ic}$) with ($\theta_1$) allows us to determine $r_1(h)$ and, as a result:

$$n_{it} = 2\pi \cdot A_{ci}^{te} \cdot \left\{ \int_0^{R_1'i} \int_0^{(h)} \frac{1-\cos\theta_{ic}}{2} r\, dr\, dh + \right.$$

$$\left. \int_0^{R_1} \int_{r_1(h)}^{R} \frac{1-\cos\theta_{ic}}{2}\left(\frac{S(\theta_{ic}) \cap S(R)}{S(\theta_{ic})}\right) r\, dr\, dh \right\}$$

where:

$\_S(\theta_{ic}) = \pi R_c^2$, $R_c = h \cdot tg(\theta_{ic})$ $$\_S(\theta_{ic}) \cap S(R) = 2\left[\int_{r-R_c}^{l} \sqrt{R_c^2-(x-r)^2} \cdot dx + \int_l^R \sqrt{R^2-x^2} \cdot dx\right]$$

$$l = \frac{R^2+r^2-R_c^2}{2r}$$

IV—Solution to the Problem Involving Media Having Several Types of Nuclei Emitting Particles with Different Energies and Activities.

A technique for extracting energy is used whereby an absorbent medium must be installed in contact with the solid state nuclear track detector in a manner such that only those particles having the largest energy can reach the detector and the other energies follow in sequence.

And if it appears that for a given medium, the ability to separate the energies by the SSNTD using an absorbent medium is not feasible, then an absorbent medium of thickness ($h_a$) is installed in contact with the detector with different thicknesses ($h_a$) of the absorbent medium, in a manner such that the number of cases of thicknesses ($h_a$) of the absorbent medium coincides with the total number of different alpha emitters of the medium to be analyzed. As a result, one has the number of equations linking the total number of tracks observed for each ($h_a$) to the activities of the different alpha emitters, [illegible] of the alpha activities of the different emitters (the unknowns). Thus, [illegible] alpha activities of the different emitters.

For the determination of ($\theta_{ic}(h)$), ($\theta_{ic1}(h)$), ($\theta_{ic2}(h)$) of each type of nucleus in the presence of an absorbent medium, the method is to use two equations ($\theta_c=f(E_{res})$) and ($\theta_i=f(E_{res})$) (see part B of paragraph II-1-1) and the calculation methodology is the same while taking into account the presence of the absorbing medium.

V—Conclusion:

This direct technique allowing the dosimetry of the radioactive nucleii in different types of samples has been developed at home and in an individual manner. It is based on the use of a novel method adapted to the experimental conditions using the solid state nuclear track detectors.

It consists in calculating the probability $P_i(r,h)$ that an alpha particle emitted by a radioactive nucleus contained in the volume dv of a sample can be detected by a solid state nuclear track detector, where (dv) is the volume element of a cylinder having a radius between r and r+dr and a height between h and h+dh inside the sample to be analyzed.

This method is easy to implement even though its formalism appears quite complex. It is precise, absolute, and not costly.

Solely for reasons of simplification of the calculations the radius is set of the detector equal to the radius of the irradiation cell, the methodology of calculation is the same for a radius of the detector less than the radius of the irradiation cell with small modifications at the step of evaluation of the surfaces of intersection $\{S(\theta_{ic}) \cap S(R)\}$ and $\{S(\theta_{ic1},\theta_{ic2}) \cap S(R)\}$, this time, the calculation must be made of the surfaces of intersection for r (characterizing the position of the emitting nucleus) less than the radius of the detector and for r greater than the radius of the detector.

In a general manner, regardless of the appearance of the experimental function of the intrinsic critical angle of a detector $\theta_c = F(E_{res})$ and for the position $(h_i)$, more than 2 intersections with $\theta_i(h_i)$ are present, the efficiency of the detection for these positions $(h_i)$ will be a series of combinations between the two general formulas for efficiencies of detection described in this paper, the one corresponding to a single intersection and the other corresponding to two intersections, where the nature of this combination depends on the number of intersections.

REFERENCES

[1] G. Somogyi, Nucl. Instr. Meth., 173, 21 (1980).
[2] J. F. Ziegler, Programme TRIM.

The invention claimed is:

1. A process for defining a probability of detection by a detector of traces of nuclear particles for nuclei of different types, the process comprising:
   identifying angles of incidence $(\theta_{ic})$, $(\theta_{ic1})$ and $(\theta_{ic2})$ of alpha particles of energy (Ei) emitted by the nucleus and reaching the detector;
   detecting the angles of revelation of the detector;
   determining a relation between the angle of incidence $(\theta_i)$ of the particles on the detector and the angle of revelation $(\theta_c)$ of the detector for values (h) characterizing an intersection between the angle of incidence of the particular on the detector and the angle of revelation of the detector;
   obtaining either zero intersections or two intersections for each of the values (h) and which correspond to a maximum energy $(E_{max})$ and a minimum energy $(E_{min})$ that are detectable in oblique incidence of the particles for each of the values (h);
   identifying and evaluating intersection surfaces $\{S(\theta_{ic}) \cap S(R)\}$ and $\{S(\theta_{ic1},\theta_{ic2}) \cap S(R)\}$ representing respectively the intersection surfaces between the surface described by the angle $(\theta_{ic})$ on a plane of the detector and that of the detector at a radius (R) and the intersection surface between a surface described by a ring limited by the angles $(\theta_{ic1})$ and $(\theta_{ic2})$ on the plane of the detector and that of the detector at the radius (R), a residual energy of the alpha particle of energy Ei emitted by the nucleus at a height (h) of the plane of the detector is in an interval $E_{min} \leq E_{ind} \leq E_{max}$ such that particles are emitted under angles between $(\theta_{ic1})$ and $(\theta_{ic2})$ for which $E_{ind} > E_{max}$, a proportion of the particles emitted by a nucleus located in a position of coordinates (r,h) and under angles of incidence below a critical angle of incidence $(\theta_{ic})$ which reach the detector is a ratio between a surface defined by the surface $S(\theta_{ic})$ described by the angle $(\theta_{ic})$ on the plane of the detector and the surface $S(\theta_{ic})$ described by the angle $(\theta_{ic})$ on the plane of the detector defined by $$\left\{\frac{S(\theta_{ic})S(\theta_{ic})S(R)}{S(\theta_{ic})}\right\} \text{ and;}$$

determining a function $P_i(r,h)$ expressing the probability of detection by the detector of traces of nuclear particles for each type of nucleus emitting the alpha particles of energy Ei for $E_{min} \leq E_{ind} \leq E_{max}$ in which $$P_i(r,h) = 1 - \cos\theta_{ic} \left(\frac{1-\cos\theta_{ic}}{2}\right)\left\{\frac{S(\theta_{ic}) \cap S(R)}{S(\theta_{ic})}\right\}$$

in which $S(\theta_{ic}) = \pi R_c^2, R_c = h \cdot tg(\theta_{ic})$.

2. The process of claim 1, further comprising:
using a position for $E_{ind} > E_{max}$, a proportion of particles emitted by a nucleus located in a position of coordinates (r,h) and under angles of incidence between $(\theta_{ic1})$ and $(\theta_{ic2})$ and reaching the detector being a ratio between the intersection surface defined by surface $S(\theta_{ic1},\theta_{ic2})$ described by angles $(\theta_{ic1})$ and $(\theta_{ic2})$ on the plane of the detector and the surface $S(R)$ of the detector and the surface $S(\theta_{ic1},\theta_{ic2})$ of the ring described by angles $(\theta_{ic1})$ and $(\theta_{ic2})$ on the plane of the detector in accordance with $$\left\{\frac{S(\theta_{ic1},\theta_{ic2}) \cap S(R)}{S(\theta_{ic1},\theta_{ic2})}\right\}; \text{ and}$$

determining a function $P_i(r,h)$ of a probability of detection by the detector of nuclear particles for each type of nucleus emitting alpha particles of Ei in which the function $P_i(r,h)$ is in accordance with $$P_i(r,h) = \left(\frac{\cos\theta_{ic1} - \cos\theta_{ic2}}{2}\right)\left\{\frac{S(\theta_{ic1},\theta_{ic2}) \cap S(R)}{S(\theta_{ic1},\theta_{ic2})}\right\}$$

where $$\left(S(\theta_{ic1},\theta_{ic2}) = \pi\left(R_{c2}^2 - R_{c1}^2\right)\right)$$

and $R_{c1} = h \cdot tg(\theta_{ic1})$ and $R_{c2} = h \cdot tg(\theta_{ic2})$.

3. The process of claim 1, further comprising:
distributing a total volume $(V_t)$ of contribution to the traces in a series of volumes $V_j(V_t = \Sigma V_j)$ where each $V_j$ corresponds to a function representing an efficacy of detection $P_{ij}(r,h)$.

* * * * *